Dec. 31, 1968           G. W. MAO           3,419,404
PARTIALLY NITRIDED ALUMINUM REFRACTORY MATERIAL
Filed June 26, 1964
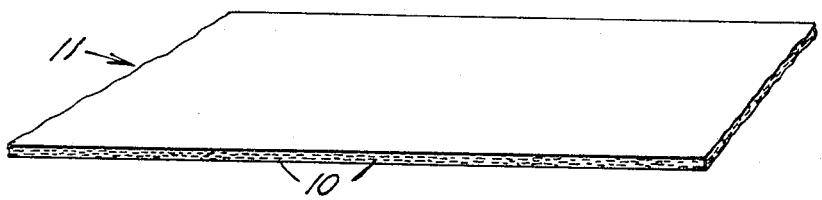
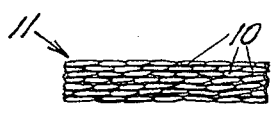
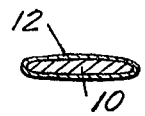
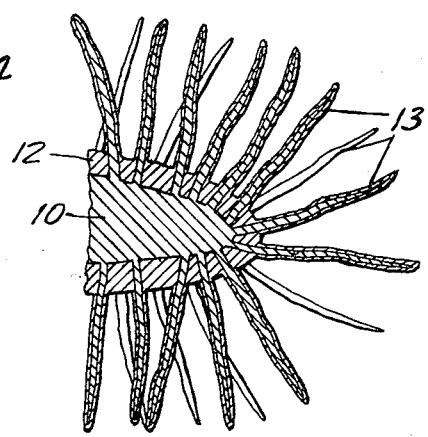
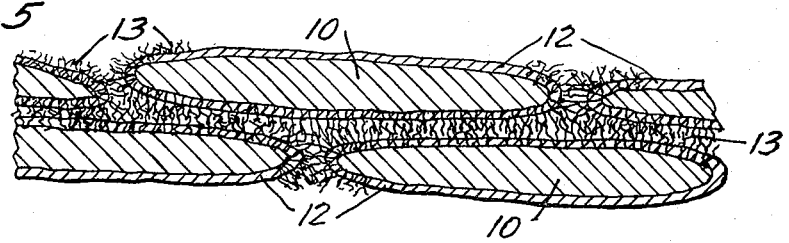
INVENTOR.
GEORGE W. MAO
BY
Carpenter, Abbott, Coulter & Kinney
ATTORNEYS

United States Patent Office 3,419,404
Patented Dec. 31, 1968

3,419,404
PARTIALLY NITRIDED ALUMINUM REFRACTORY MATERIAL
George W. Mao, St. Paul, Minn., assignor to Minnesota Mining and Manufacturing Company, St. Paul, Minn., a corporation of Delaware
Filed June 26, 1964, Ser. No. 378,370
7 Claims. (Cl. 106—65)

This invention relates to a refractory composite material combining the desirable features of metal and ceramics for certain high temperature applications.

It is well known that ceramic material, although capable of high temperature applications requiring good mechanical strength and oxidation resistance, is very brittle and has a low resistance to thermal shock. Metal on the other hand, is not brittle and has a high thermal shock resistance but is poor in oxidation resistance. Thus, neither of the two materials is suitable for the many high temperature applications that require good thermal and impact shock resistance and oxidation resistance. In the present invention the desiarble features of the two materials are uniquely combined to form a product that has the thermal and impact shock resistance of metal and the oxidation resistance of ceramics in addition to suitable mechanical strength for most high temperature applications.

It is an object of the invention to provide structures composed of partially nitrided aluminum. It is another object of the invention to provide strong heat and impact resistant refractory articles. Still another object of the invention is to provide a method for producing articles composed of aluminum and aluminum nitride, in which a unique interlocking of the particulate constituents of the articles is effected. Other objects will be apparent from the description found hereinafter.

In general, the preferred form of the invention comprises a structure consisting of interlocking particles that have an aluminum core and a coating of aluminum nitride. The aluminum cores of the particles give the material the flexibility which enables it to withstand substantial thermal and impact shock. The coating of aluminum nitride accomplishes several functions. It provides a casing for the aluminum which allows the application of temperatures higher than aluminum alone can withstand, it serves to protect the core against oxidation, and on the surface of the material where the particles are subjected to surrounding air, the aluminum nitride coating thereof combines with aluminum oxide to form a solid solution compound that is impervious to gases.

It will be understood that a material having the properties of the present invention is highly desirable for many applications, a few of which are listed hereafter:

(a) gas burners
(b) heat exchangers
(c) vaporizing "boat" for continuous aluminum vapor coating
(d) high temperature resistant materials for inert parts of missile propulsion systems
(e) high temperature insulation and conducting materials
(f) aircraft and astronautics applications
(g) bonding agents for inert granular refractory materials The invention and its advantages and applications will be further understood by reference to the following detailed description and drawings in which:

FIGURE 1 illustrates a mass of aluminum particles pressed into the shape of a flat sheet;

FIGURE 2 is an enlarged segmental view of the sheet of FIGURE 1;

FIGURE 3 illustrates a single particle in section after the sheet has undergone the first step of converting the sheet into the material of the present invention;

FIGURE 4 illustrates a greatly enlarged portion of a single particle in section after the sheet has been converted into the material of the present invention; and FIGURE 5 illustrates the manner in which the particles of the material of the present invention are interlocked.

Referring to FIGURES 1 and 2, in the preferred embodiment of the invention a mass of aluminum metal powder flakes 10 is mixed with approximately 1–2% binder by weight (e.g., 15% solution or paraffin in $CCl_4$), dried and pressed into the shape of a flat sheet 11. It has been found that the flakes of aluminum such as Merck U.S.P. Aluminum fine flaky powder are preferable over the spherical powder for reasons which are set forth hereafter. It has also been found desirable to use as little binder as possible in forming the mass due to the contamination that can be caused thereby. In forming sheets of the present invention into a thickness of approximately $\frac{1}{16}$–$\frac{1}{8}$ inch using the above percentage of binder, pressure on the order of 10,000 p.s.i. has been employed.

The resulting sheet is then placed in a furnace in the presence of nitrogen and fired to approximately 600° C. for a period of approximately 10 to 20 hours. This temperature is below the melting point of the aluminum and yet is sufficiently high to cause substantial reaction between the aluminum and the nitrogen. In the period of 10 to 20 hours, approximately 5 to 10 percent of the aluminum reacts with the nitrogen to form an aluminum nitride shell 12 around the aluminum core 10.

The temperature of the furnace is then raised to approximately 1100° C. and maintained for approximately ½ hour. This temperature is above the melting point of aluminum, and because the thin shell 12 of aluminum nitride is porous, the molten aluminum seeps through the shell and extends outwardly of the particle in fiber-like appendages 13. The result of this process is illustrated in FIGURE 5. The fibers of the adjacent particles flow together or become entwined, while at the same time, because of the continued presence of nitrogen, the fibers themselves become coated with aluminum nitride. During this process the shell 12 becomes thicker, thus continually reducing the porosity until the flow of aluminum through the shell is substantially stopped. The extent of flow of the aluminum through the shell during this second stage of the process depends on several factors, i.e., the thickness of the shell after the first stage, the rapidity of the heat buildup between the two stages and the shape of the particles. Thus, when the shell builds up to a substantial thickness so as to become substantially nonporous and particularly with respect to the amount of aluminum remaining in the core, the flow will stop, and further heat application only serves to build up the thickness of the shell. Even this buildup is substantially stopped as the shell becomes impervious to the nitrogen which then prevents further reaction with the aluminum core. Of course, the more the core is reduced, the less thermal shock resistant the resulting material becomes but, on the other hand, the greater mechanical strength it will have due to the entwining of the fibers. Thus, it is understood that the above-mentioned factors can be varied to balance out the desired features in accordance with the application to be made of the material. It has been found that a material that is quite good in both of the properties is derived when the heat bulidup between the stages is accomplished in approximately one hour, i.e., from 600° C. to 1100° C., or 500° per hour.

After the sheet is formed by the above two processes, a third stage may be employed which comprises a firing of the material in the presence of oxygen. The oxygen reacts with aluminum that is either leached out of the aluminum cores or from the aluminum nitride of the particles at the surface of the sheet to form aluminum oxide. The aluminum oxide and aluminum nitride then combine to form a solid solution compound over the surface that is gas-impervious, making the material oxidation resistant. However, this step can be omitted from the original construction of the material due to a natural forming of the solid solution compound when the material is actually put to use in a high temperature application, wherein oxygen from surrounding air is almost always present.

In the construction of the above material it is believed to be important to use flakes of aluminum as opposed to spherical shapes of powder, for the reason that the structures made with flakes become much more compact and thereby aid in making the material gas-impervious. Furthermore, when the leaf-like flake is coated with the aluminum nitride, the mass of the shell is much greater with relation to the core than it would be if the particles were initially spherical. This relationship is believed to be material in preventing molten aluminum from seeping through the shell when the finished material is subjected to very high temperatures, i.e., in the range of 2000° C.

Although the applicant does not wish to be limited to the following theories, it is believed that the particles near the surface of the material, because they are more vulnerable to the surrounding nitrogen, are provided with much thicker shells and combine with overlapping adjacent particles to form a tight continual coating which aids in preventing oxygen from penetrating into the aluminum cores. Furthermore, it is also believed possible that when the material is subjected to very high temperature, the fact that the aluminum cores become molten may well aid in making the material shock and impact resistant.

It is understood that the above is merely a description of the preferred embodiment of the invention and does not limit the scope of the following claims.

What is claimed is:

1. A refractory composite material comprising a mass of partially nitrided fine aluminum particles selected from the group consisting of aluminum powder and fine aluminum flakes, said particles having an aluminum core and an outer aluminum nitride shell, and said particles having fiber-like appendages interlocked with appendages of adjacent particles to bind the particles of the mass together.

2. A refractory composite material comprising a mass of partially nitrided fine aluminum flakes, said flakes having aluminum cores and aluminum nitride shells, and fiber-like appendages extending from said flakes and being joined to and entwined with the appendages of adjacent particles to interlock the particles into an integral mass.

3. A refractory composite material as defined in claim 2, wherein the fiber-like appendages also have an aluminum core and an aluminum nitride shell.

4. A refractory composite material as defined in claim 2, wherein the surface of the material is coated with an aluminum nitride-aluminum oxide gas impervious solid solution compound.

5. A method for making a refractory composite material including forming a mass of fine aluminum particles into a predetermined shape, partially nitriding the particles by firing them in the presence of nitrogen in the approximate range of about 600° C. and below the melting point of aluminum for a period of about 10 to 20 hours to form an outer shell of about 5 percent to 10 percent by weight of the aluminum into aluminum nitride and increasing the firing temperature to the approximate range of about 1100° C. to melt the aluminum and thus form appendages on the particles that become entwined and joined so as to interlock the particles of the mass, while further nitriding the particles to render them impervious.

6. A method for making a refractory composite material including forming a mass of fine aluminum flakes with approximately two percent binder by weight into a predetermined shape, firing the mass to approximately 600° C. in the presence of nitrogen for a period of approximately 10 to 20 hours, increasing the firing temperature to approximately 1100° C. at the rate of 500° C. increase per hour, and holding the firing temperature at approximately 1100° C. for approximately one-half hour.

7. A method for making a refractory composite material as defined in claim 6, including firing the material in the presence of oxygen to form an aluminum-nitride, aluminum-oxide solid solution compound on the surface of the material.

References Cited

UNITED STATES PATENTS

| 2,929,126 | 3/1960 | Bollack et al. | 106—55 |
| 3,108,887 | 10/1963 | Lenie et al. | 106—65 |

JAMES E. POER, *Primary Examiner.*

U.S. Cl. X.R.

23—192